United States Patent Office 2,881,034
Patented Apr. 7, 1959

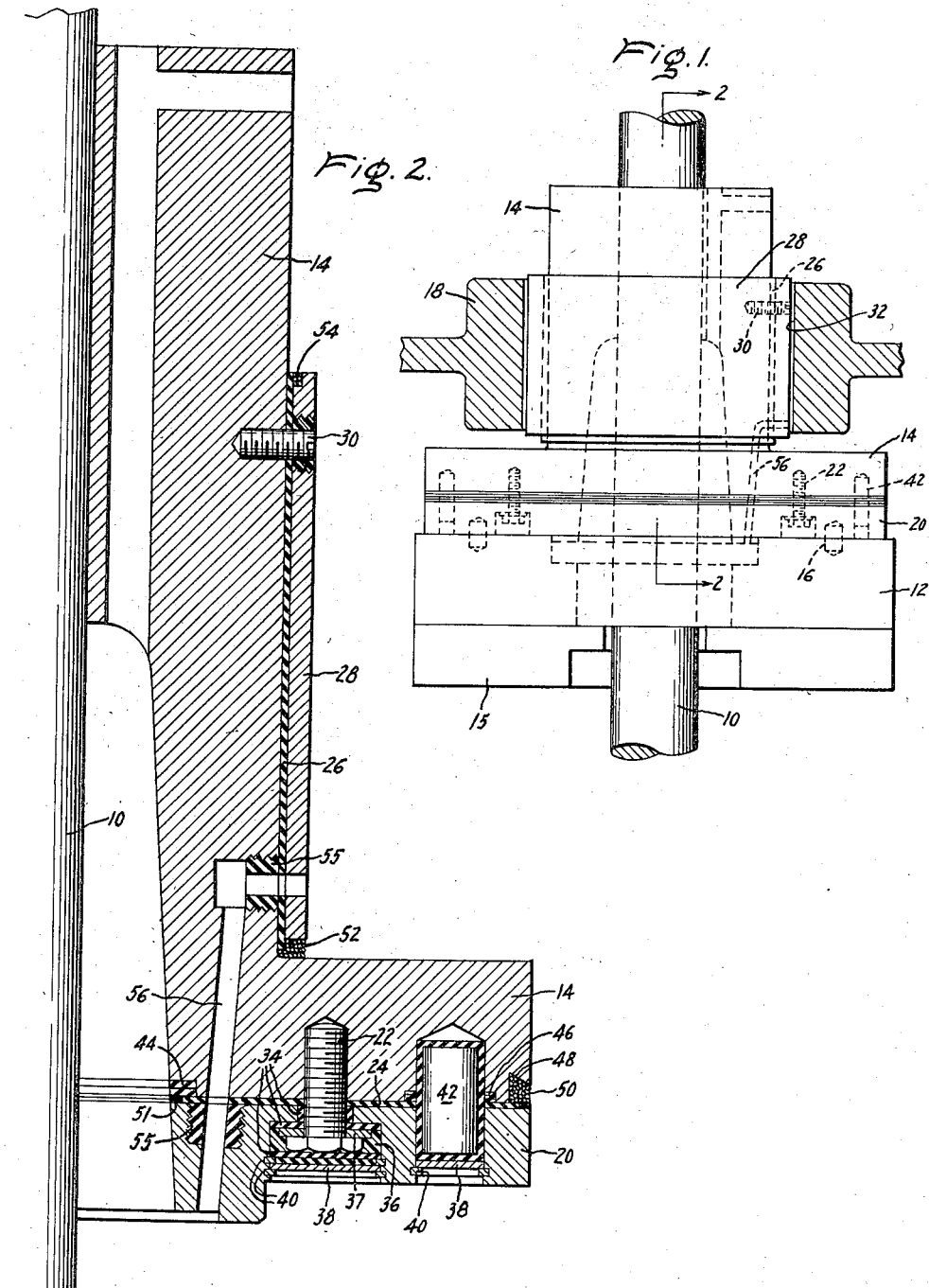

2,881,034

INSULATED JOURNAL SLEEVE AND THRUST PLATE FOR GUIDE AND THRUST BEARINGS

Erwin R. Summers, Scotia, N.Y., assignor to General Electric Company, a corporation of New York Application October 1, 1956, Serial No. 613,002

9 Claims. (Cl. 308—160)

The invention described herein relates to bearings and more particularly to insulated thrust and guide bearings of the type used with large vertical motors and generators, and has for its object the provision of insulating elements in non-expendable sections of a shaft supported rotating member capable of preventing passage of electric currents from the machine shaft through stationary babbitted surfaces of bearings utilized in guiding the shaft and in supporting the weight of the machine rotor and the thrust of the external load.

It is well known that a portion of the magnetic field produced by the coils of dynamoelectric machines may occasion periodic changes in the flux linking the shaft and thus generate voltages which can cause electric currents to circulate through the shaft and the various uninsulated bearings of the machine. Because the shaft journal is separated by an insulating oil film from the babbitted surfaces of the bearing, such currents arc through this film and cause deterioration of oil and also create pits in the surfaces of the rotating journal and stationary babbitt of the guide bearing and in the surface of the runner and babbitt of the thrust bearing. It is therefore evident that depending on their magnitude, shaft currents can cause failure of uninsulated bearings within a few hours or during several months of operation. Shaft voltages normally tend to increase with the size of the machine, but there is no direct proportionality between them.

Realizing this, manufacturers resorted to separately insulating the stationary guide and thrust bearings, and this remedy proved effective in preventing the deleterious pitting of babbitt and deterioration of oil previously encountered. In doing so, however, the insulation of such bearings is located in those parts of the bearings designed to be separately installed, removed or rebabbitted, so that the possibility of damaging the insulation while the parts are being handled is great. Further, not only are replacement costs increased because of the added expense for providing new insulation with each new bearing, but also complete new insulated bearings or bearing supports must be furnished for uninsulated machines in the event that non-foreseeable shaft voltages are generated after the machine is installed in the field.

It has been found that in installations requiring electrically insulated bearings, situations arise where it is advantageous to locate the insulation at points where the possibility of damage thereto is remote in the event replacement or repair of the bearing parts is necessary. Ideally, the insulation should be mounted permanently in non-expendable parts in the machine during manufacture, thereby reducing the cost to a purchaser in the event new bearings are necessary during the life of the machine.

In carrying out my invention, I eliminate the above-cited disadvantages now present in insulated bearings by insulating the rotating sleeve or journal at two distinct points instead of the bearings, thereby preventing flow of electric current from the shaft through the plate thrust bearing and babbitted guide bearing at the upper end of the machine.

While the specification concludes with claims particularly pointing out and distinctly claiming the subject matter which I regard as my invention, it is believed that the invention will be better understood from the following description taken in connection with the accompanying drawing in which:

Figure 1 is a view in elevation illustrating generally the arrangement of parts in a thrust bearing and a guide bearing and location of insulation therein; and Figure 2 is a detailed view in elevation, partly in section, taken on lines 2—2 of Figure 1.

Referring now to the drawings wherein like reference characters designate like or corresponding parts throughout the several views, there is shown a shaft 10 for a dynamoelectric machine (not shown) vertically extending through a stationary frame comprising a part of the machine. A runner 12 of a thrust bearing is connected with the bottom section of an inner sleeve 14 by dowels 16 arranged in a circular pattern in the mating surfaces of the sleeve 14 and the runner. This runner is supported by the babbitted segments or shoes 15 of the stationary thrust bearing. The upper portion of sleeve 14 also surrounds and is keyed to the shaft 10 and rotates within a stationary guide bearing 18 adapted for attachment to the frame of the machine.

The above described structure is common to a conventional thrust bearing and guide bearing assembly normally used in absorbing thrust and centering the rotating parts about an axis extending through the shaft. In order to electrically insulate this structure for preventing transfer of electric currents therethrough and still retain the necessary stability, the lower portion of sleeve 14 is cut on a line normal to the shaft axis to provide a lower plate 20 which is thereafter attached to the sleeve by insulated bolts 22. Insulation 24, Figure 2, such as molded mica or glass cloth impregnated with polyester resin, having a low degree of compression and being capable of transmitting loads uniformly therethrough, is inserted between the lower plate 20 and bottom surface 21 of the sleeve 14. The selection of insulating material is important since this part of the bearing is subjected to the weight of the motor rotor plus the thrust forces exerted by the driven device, such as a pump, connected to the machine. Therefore, unsymmetrical deformation of the insulation would cause the bearing runner 12 to wobble as it turned and thereby impose impulse loads successively on each of the several supported bearing segments or tilting shoes 15 normally provided for absorbing thrust forces and accommodating misalignment of parts. The amount of compensation for a runner that does not turn true however, is not so great as to permit substantial unsymmetrical compression of the insulation.

In order to minimize the possibility of such uneven deformation, the insulating disc 24 of the embodiment herein chosen for illustration, was made .015 inch thick so that a 5 percent dissymmetry in deformation would correspond to less than one mil, which is within tolerable limits. After the disc is ground to a uniform thickness, the insulated bolts 22 are tightened to provide a preload as great as or greater than, the thrust imposed on the machine, which in the specific embodiment measured 48,000 pounds. Tests performed on the above-described structure show that it is capable of carrying a 50 percent overload with a corresponding maximum compression in the insulating disc 24 of less than one mil.

The passage of electric currents from the shaft 10 through the sleeve 14 to stationary guide bearing 18 is prevented by molding a mica cylinder 26 on the outer surface of sleeve 14 and subsequently grinding it to a small tolerance. Outer bearing contact sleeve 28 is firmly attached to the mica cylinder and sleeve 14 by a heavy shrink fit. Insulated dowel pins 30 serve to prevent movement of the sleeve 28 relative to the mica cylinder after assembly in the event that the shrink fit were momentarily relieved by a sudden and abnormal rise in bearing temperature. It will be noted that the mica cylinder of insulation is now positioned on the shaft side of the bearing clearance provided between the outer journal surface of the bearing contact sleeve 28 and the babbitted surface 32 of guide bearing 18.

Reflection on the structure thus far described will show that unless suitable precautions are taken, creepage paths may form over the edges of the thin insulation materials to permit circulation of current through the thrust and guide bearings. In order to overcome the establishment of such paths, each of the several bolts 22 securing the lower plate 20 to the sleeve 14 is isolated electrically from the lower plate by melamine glass tubes and washers 34. A steel washer 37 is located between the insulating washer 34 and head of bolt 22. In addition, the space 36 around the bolt heads is filled with chopped glass strands and epoxy resin, while steel washer 38, held in place by snap rings 40, protects the insulation around the bolt from external damage. Likewise, the dowel pins 42 used for accurately positioning the lower plate 20 with respect to the bottom surface of the sleeve 14 are insulated in a similar manner. Dowel pins 30 utilized in locating the rotating outer sleeve 28 to the inner sleeve 14 are also provided with chopped glass strands and epoxy resin for improving the insulating properties of the guide bearing.

To increase the creepage distance across the edges of insulation 24, rings of insulation 44, such as that sold under the trade name "Textolite," are embedded in the inner peripheral surface of sleeve 14 to overlap and make contact with the insulation 24. Rings 46 of similar composition encompass the dowel pins 42 for the same purpose.

Since the lower plate 20 and sleeve 14 rotate in oil, a slot 48 is provided in the outer surface of the sleeve 14 and is filled with glass warp beam 50 impregnated with epoxy resin to prevent erosion of mica flakes from the outer edge of the rotating insulation disc 24. The inner edge of the disc is protected with similar insulation at 51. The same warp beam and epoxy resin insulation is provided at 52 and 54 where edges of mica cylinder 26 terminate at the ends of outer sleeve 28. Upon curing of the resin, a complete bond having excellent insulating properties precludes flaking of the mica while simultaneously increasing the creepage paths from the sleeve 14 to the plate 20 and to the outer sleeve 28.

Textolite plugs 55, located in the oil supply passages 56 for providing oil to the guide bearing surface 32 are held in place by machined threads sealed with resin to increase the electrical creepage distance where the oil holes pass through the insulation 24 and 26.

In view of the above, it will be apparent that many modifications and variations are possible in light of the above teachings. For example, a large vertical machine has been chosen to illustrate the principles of the invention and it will be obvious these teachings are equally applicable to other types of dynamoelectric machines. Further, the various types of insulation utilized in electrically isolating the parts are shown by way of illustration only, and it is not my intention to be limited to the specific insulation described. It therefore is to be understood that within the scope of the appended claims, the invention may be practiced otherwise than as specifically described.

What I claim as new and desire to secure by Letters Patent of the United States is:

1. An insulation system for protecting bearings from electric currents due to voltages generated in shafts of dynamoelectric machines comprising, a shaft adapted for supporting a rotor for said machine, a journal sleeve connected with and arranged for rotation with said shaft, said journal sleeve comprising a top portion of cylindrical configuration having an outer surface adapted for rotative contact in a guide bearing for said machine, insulating means anchored in said journal sleeve for preventing the transfer of electric currents from said shaft to said guide bearing, said journal sleeve further comprising a bottom portion including a flange integrally formed with said top portion for absorbing thrust forces in a direction axially of said shaft, a member attached to said flange, and insulation compressed between said flange and said member and capable of uniformly transmitting thrust forces and preventing flow of said electric currents therethrough.

2. An insulation system for electrically isolating bearings associated with a dynamoelectric machine comprising, a shaft adapted to extend axially through a thrust bearing and guide bearing, a journal sleeve rigidly affixed at one end to said shaft and provided with a surface arranged for rotation in said guide bearing, the other end of said journal sleeve being out of contact with said shaft but provided with an attached plate having a face normal to the shaft axis and arranged for contact with a runner of said thrust bearing, and insulating means in said journal sleeve for preventing the flow of electric current from said shaft through said guide and thrust bearings, said insulating means comprising a cylindrical layer of insulation interposed between the shaft and outer surface of said journal sleeve, a second separate layer of insulation interposed between the journal sleeve and said plate rigidly attached to the lower end thereof, said insulation being capable of withstanding forces absorbed by said thrust bearing positioned in a plane parallel thereto, thereby permitting replacement of said guide and thrust bearings without renewing the insulation in said system.

3. An insulation system for electrically isolating bearings associated with a dynamoelectric machine comprising a shaft adapted to extend axially through a thrust and guide bearing in said machine, a journal sleeve rigidly affixed to said shaft and having an upper cylindrical portion arranged to rotate in a guide bearing and terminating at its lower end in a flange provided with an attached plate positioned to engage a runner of said thrust bearing, means insulating said shaft from said guide and thrust bearings, said means comprising a cylinder of insulating material on said upper cylindrical portion and an outer journal sleeve fitted thereon and anchored in rigid relationship with said cylindrical portion so as to preclude relative movement therewith when said outer sleeve rotates in said guide bearing, and second insulation means in said journal sleeve between said plate and said flange for preventing transfer of electric currents from said shaft to said thrust bearing, said second insulation means comprising a disc of insulating material lying in a plane parallel with said runner and having a degree of compressibility capable of uniformly transmitting loads imposed on said plate by the runner of said thrust bearing while simultaneously preventing passage of electric currents thereto.

4. The construction according to claim 3 wherein said disc of insulating material is capable of carrying forces at least equal to that imposed on the runner of said thrust bearing without deforming to an extent to cause misalignment of said thrust runner.

5. The combination according to claim 3 wherein said outer journal sleeve is prevented from movement relative to said cylindrical portion by a plurality of insulated restraining elements, and wherein said plate is firmly attached to said flange by a series of insulated compressing members, the insulation on said restraining elements and compressing members being effective to prevent establishment of creepage paths for electric currents across said means insulating said shaft from said thrust and guide bearings.

6. The combination according to claim 3 wherein said flange is provided with an annular groove formed at the point of juncture with said disc of insulating material, and insulation in said groove for preventing establishment of a creepage path for electric currents from said flange to said plate and for preventing hydraulic abrasion of edges of said disc when said cylindrical portion is rotated in oil provided said thrust bearing.

7. An insulation system for electrically isolating a guide bearing from a dynamoelectric machine including a shaft adapted for connection at one end to said machine and having a portion of its other end embraced by a guide bearing associated with said machine, the improvement comprising an inner sleeve attached to said shaft for rotation therewith, a cylinder of insulation on said inner sleeve and an outer sleeve shrunk over said cylinder of insulation, said outer sleeve being further secured to said inner sleeve by a plurality of insulated dowel pins capable of preventing relative rotation between the sleeves and for minimizing the transfer of electric current therebetween, said outer sleeve having an exterior surface machined for rotative contact in said guide bearing.

8. An insulation system for electrically isolating a thrust bearing from a dynamoelectric machine comprising a shaft adapted for connection at one end to said machine and having a runner connected adjacent the other end of said shaft and being designed to coact with a thrust absorbing element in said bearing, a plate affixed to a bottom end of said runner, electrical insulation interposed between said plate and said runnner for preventing the transfer of electric currents from said shaft through said runner and into the operating parts of said thrust bearing, and means urging said plate into engagement with said runner to compress the said insulation with a force greater than the thrust load carried by said thrust bearing.

9. The combination according to claim 3 wherein oil passageways extend through the rotating parts of said guide and thrust bearings, and insulation in said oil passageways in the area where said plate is attached to the flange of said thrust bearing and where the outer sleeve is secured to the cylindrical member of the guide bearing thereby establishing long creepage paths between adjacent metallic parts and across the insulation.

References Cited in the file of this patent

UNITED STATES PATENTS

| 1,130,904 | Honold | Mar. 9, 1915 |
| 1,152,680 | Wieselgreen | Sept. 7, 1915 |
| 1,806,061 | Howarth | May 19, 1931 |
| 2,783,101 | Walker | Feb. 26, 1957 |